(12) United States Patent
Rosser et al.

(10) Patent No.: US 12,520,878 B2
(45) Date of Patent: Jan. 13, 2026

(54) SYSTEM COMPRISING AN AEROSOL PROVISION SYSTEM AND A COMPUTER

(71) Applicant: NICOVENTURES TRADING LIMITED, London (GB)

(72) Inventors: Nicholas Rosser, London (GB); Connor Bruton, London (GB); Charanjit Nandra, London (GB); David Rushforth, London (GB); Darryl Baker, London (GB); Robert Kersey, London (GB); Mark Crosier, London (GB)

(73) Assignee: NICOVENTURES TRADING LIMITED, London (GB)

( * ) Notice: Subject to any disclaimer, the term of this patent is extended or adjusted under 35 U.S.C. 154(b) by 352 days.

(21) Appl. No.: 17/754,912

(22) PCT Filed: Oct. 14, 2020

(86) PCT No.: PCT/GB2020/052555
§ 371 (c)(1),
(2) Date: Apr. 15, 2022

(87) PCT Pub. No.: WO2021/074610
PCT Pub. Date: Apr. 22, 2021

(65) Prior Publication Data
US 2024/0122263 A1    Apr. 18, 2024

(30) Foreign Application Priority Data

Oct. 16, 2019  (GB) ...................................... 1914949
Jul. 10, 2020  (GB) ...................................... 2010612

(51) Int. Cl.
*A24F 40/53*    (2020.01)
*A24F 40/60*    (2020.01)
(Continued)

(52) U.S. Cl.
CPC .............. *A24F 40/53* (2020.01); *A24F 40/60* (2020.01); *A24F 40/65* (2020.01); *A61M 11/042* (2014.02);
(Continued)

(58) Field of Classification Search
CPC ........ A24F 40/53; A24F 40/60; A24F 40/065; A61M 11/042; A61M 2205/582; A61M 2205/3379; A61M 2230/42; G08B 6/00
See application file for complete search history.

(56) References Cited

U.S. PATENT DOCUMENTS

2010/0094099 A1    4/2010   Levy et al.
2012/0214107 A1    8/2012   Al Gharib
(Continued)

FOREIGN PATENT DOCUMENTS

JP    2017538410 A    12/2017
JP    2019518441 A     7/2019
(Continued)

OTHER PUBLICATIONS

International Search Report and Written Opinion for Application No. PCT/GB2020/052555, mailed on Jan. 12, 2021, 15 pages.
(Continued)

*Primary Examiner* — Michael H. Wilson
*Assistant Examiner* — Ronnie Kirby Jordan
(74) *Attorney, Agent, or Firm* — Burr & Forman

(57) ABSTRACT

A system including an aerosol provision system and a computer is disclosed. The aerosol provision system is configured to generate aerosol from an aerosol-generating material. The computer is configured to obtain user behavior data relating to an amount of an ingredient delivered from the aerosol-generating material to a user of the aerosol provision system. The computer determines default user behavior with respect to the amount of the ingredient to be
(Continued)

delivered on the basis of the obtained user behavior data. The computer identifies, based on the obtained user behavior, under what conditions to deliver a notification to the user, the notification informing the user of a current user behavior.

25 Claims, 4 Drawing Sheets

(51) Int. Cl.
*A24F 40/65* (2020.01)
*A61M 11/04* (2006.01)
*A61M 15/06* (2006.01)
*G08B 6/00* (2006.01)

(52) U.S. Cl.
CPC .............. *A61M 15/06* (2013.01); *G08B 6/00* (2013.01); *A61M 2205/3379* (2013.01); *A61M 2205/582* (2013.01); *A61M 2230/42* (2013.01)

(56) References Cited

U.S. PATENT DOCUMENTS

| | | |
|---|---|---|
| 2014/0305450 A1 | 10/2014 | Xiang |
| 2015/0024355 A1 | 1/2015 | Ghofrani et al. |
| 2015/0245660 A1 | 9/2015 | Lord |
| 2016/0324469 A1 | 11/2016 | Utley et al. |
| 2016/0371437 A1 | 12/2016 | Alarcon et al. |
| 2018/0338529 A1 | 11/2018 | Weigensberg et al. |
| 2019/0261687 A1* | 8/2019 | Wensley .............. A61M 11/001 |
| 2020/0120987 A1 | 4/2020 | Atkins et al. |

FOREIGN PATENT DOCUMENTS

| | | | |
|---|---|---|---|
| KR | 20120080477 A | 7/2012 | |
| KR | 20160130143 A | 11/2016 | |
| RU | 2017123539 A | 1/2019 | |
| WO | WO-2016091658 A1 * | 6/2016 | ........... A24B 15/167 |
| WO | 2016123587 A1 | 8/2016 | |
| WO | WO-2017056103 A1 * | 4/2017 | ............ A24F 40/50 |
| WO | 2018060798 A1 | 4/2018 | |
| WO | 2018098371 A1 | 5/2018 | |
| WO | 2018224823 A1 | 12/2018 | |
| WO | 2019104223 A1 | 5/2019 | |
| WO | WO-2020104375 A1 | 5/2020 | |

OTHER PUBLICATIONS

Search Report for Great Britain Application No. 2010612.6, mailed Dec. 29, 2020, 3 pages.
International Preliminary Report on Patentability received for PCT Patent Application No. PCT/GB2020/052248, mailed on Apr. 28, 2022, 9 pages.
International Preliminary Report on Patentability received for PCT Patent Application No. PCT/GB2020/052555, mailed on Apr. 28, 2022, 9 pages.
International Search Report and Written Opinion for Application No. PCT/GB2020/052248, mailed on Dec. 2, 2020, 12 pages.
Notice of Reasons for Refusal received for Japanese Patent Application No. 2022-522318, mailed on Mar. 28, 2023, 10 pages (5 pages of English Translation and 5 pages of Official Copy).
Office Action and Search Report received for Russian Application No. 2022110217, mailed Oct. 20, 2022, 14 pages.
Notice of Reasons for Refusal from corresponding Japanese Application No. 2024-140882, mailed Sep. 24, 2025, all pages cited in its entirety.

* cited by examiner

SYSTEM COMPRISING AN AEROSOL PROVISION SYSTEM AND A COMPUTER

PRIORITY CLAIM

The present application is a National Phase entry of PCT Application No. PCT/GB2020/052555, filed Oct. 14, 2020, which claims priority from GB Patent Application No. 1914949.1, filed Oct. 16, 2019, and GB Patent Application No. 2010612.6, filed Jul. 10, 2020, each of which is hereby fully incorporated herein by reference.

TECHNICAL FIELD

The present disclosure relates to a system comprising an aerosol provision system and a computer.

BACKGROUND

Electronic aerosol provision systems such as electronic cigarettes (e-cigarettes) generally contain an aerosol-generating material, such as a reservoir of a source liquid containing a formulation, typically including nicotine, or a solid material such as a tobacco-based product, from which an aerosol is generated for inhalation by a user, for example through heat vaporization. Thus, an aerosol provision system will typically comprise an aerosol generator, e.g. a heating element, arranged to aerosolize a portion of aerosol-generating material to generate an aerosol in an aerosol generation region of an air channel through the aerosol provision system. As a user inhales on the device and electrical power is supplied to the aerosol generator, air is drawn into the device through one or more inlet holes and along the air channel to the aerosol generation region, where the air mixes with the vaporized aerosol generator and forms a condensation aerosol. The air drawn through the aerosol generation region continues along the air channel to a mouthpiece, carrying some of the aerosol with it, and out through the mouthpiece for inhalation by the user.

It is common for aerosol provision systems to comprise a modular assembly, often having two main functional parts, namely an aerosol provision device and disposable/replaceable consumable part. Typically the consumable will comprise the consumable aerosol-generating material and the aerosol generator (heating element), while the aerosol provision device part will comprise longer-life items, such as a rechargeable battery, device control circuitry and user interface features. The aerosol provision device may also be referred to as a reusable part or battery section and the consumable may also be referred to as a disposable part, cartridge or cartomizer.

The aerosol provision device and consumable are mechanically coupled together at an interface for use, for example using a screw thread, bayonet, latched or friction fit fixing. When the aerosol-generating material in a consumable has been exhausted, or the user wishes to switch to a different consumable having a different aerosol-generating material, the consumable may be removed from the aerosol provision device and a replacement consumable may be attached to the device in its place.

The amount of aerosol and aerosol generating material delivered to the user will depend at least in part on how long and how deeply the user inhales and, over a period of time, how frequently the user inhales as well. In turn, these user behaviors may be influenced by their mood. At present, there is no means to take account of such user behavior and how their changes may affect user preferences and choices with regards to use of and interactions with aerosol provision devices.

Various approaches are described herein which seek to help address or mitigate some of the issues discussed above.

SUMMARY

In accordance with some embodiments described herein, there is provided a system comprising an aerosol provision system and a computer. The aerosol provision system is configured to generate aerosol from an aerosol-generating material. The computer is configured to obtain user behavior data relating to an amount of an ingredient delivered from the aerosol-generating material to a user of the aerosol provision system. The computer then determines default user behavior with respect to the amount of the ingredient to be delivered on the basis of the obtained user behavior data. The computer then identifies, based on the obtained user behavior, under what conditions to deliver a notification to the user, the notification informing the user of the user's current behavior.

The default user behavior may be determined for an inhalation. The default user behavior may be determined for a plurality of inhalations, wherein a time between each of the plurality of inhalations is less than a predetermined time. The default user behavior may be determined based on at least one of a time in a day, a day in a week and a period of at least a week.

The user behavior data may include a duration of each inhalation and a time between each inhalation, and the user behavior data may include a residual amount of the ingredient based on the duration of each inhalation and the time between each inhalation. The user behavior data may include at least one of an operational parameter of the device, a concentration of the ingredient in the aerosol-generating material, and an indication of a flavorant present in the aerosol-generating material.

The user's current behavior may be an inhalation. The user's current behavior may be a plurality of inhalations, wherein a time between each of the plurality of inhalations is less than a predetermined time. The user's current behavior may be over a rolling time period.

The notification may comprise a suggested adjustment of the aerosol provision system. The suggested adjustment may be a setting corresponding to an amount of electrical power supplied to an aerosol generator of the aerosol generation system by a power source of the aerosol generation system, wherein the aerosol generator is configured to aerosolize the aerosol-generating material. The suggested adjustment may comprise at least one of a different aerosol-generating material, a different concentration of the ingredient and a different flavorant in the aerosol-generating material.

The notification may be provided on the aerosol provision system and/or on an application on a remote device. The notification may be a haptic notification. A parameter of the haptic notification may be adjustable by the user of the device. The notification may be configurable by the user.

The ingredient may be nicotine, caffeine, taurine, theine, a vitamin, melatonin, or a cannabinoid.

The computer may be configured to store at least one of the user behavior data and the default user behavior. The computer may be configured to transmit at least one of the user behavior data and the default user behavior to a remote device.

The aerosol provision system and the computer may be physically separated and communicate utilizing SigFox.

In accordance with some embodiments described herein, there is provided a computer configured to obtain user behavior data relating to an amount of an ingredient delivered from the aerosol-generating material of an aerosol provision system to a user of the aerosol provision system. The computer then determines default user behavior with respect to the amount of the ingredient to be delivered on the basis of the obtained user behavior data. The computer then identifies, based on the obtained user behavior, under what conditions to deliver a notification to the user, the notification informing the user of the user's current behavior.

In accordance with some embodiments described herein, there is provided a method of aerosol provision. User behavior data relating to an amount of an ingredient delivered from an aerosol-generating material to a user of an aerosol provision system is obtained. Default user behavior with respect to the amount of the ingredient to be delivered is determined on the basis of the obtained user behavior data. Based on the obtained user behavior, it is identified under what conditions to deliver a notification to the user, the notification informing the user of the user's current behavior. There is also provided a computer readable storage medium comprising instructions which, when executed by a processor, performs the above method.

These aspects and other aspects will be apparent from the following detailed description. In this regard, particular sections of the description are not to be read in isolation from other sections.

BRIEF DESCRIPTION OF THE DRAWINGS

Embodiments of the disclosure will now be described, by way of example only, with reference to accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of articles and systems discussed herein which are not described in detail may be implemented in accordance with any conventional techniques for implementing such aspects and features.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of articles and systems discussed herein which are not described in detail may be implemented in accordance with any conventional techniques for implementing such aspects and features.

The present disclosure relates to aerosol provision systems, which may also be referred to as aerosol provision systems, such as e-cigarettes. Throughout the following description the term "e-cigarette" or "electronic cigarette" may sometimes be used, but it will be appreciated this term may be used interchangeably with aerosol provision system and electronic aerosol provision system.

As noted above, aerosol provision systems (e-cigarettes) often comprise a modular assembly including both a reusable part (aerosol provision device) and a replaceable (disposable) cartridge part, referred to as a consumable. Systems conforming to this type of two-part modular configuration may generally be referred to as two-part systems or devices. It is also common for electronic cigarettes to have a generally elongate shape. For the sake of providing a concrete example, certain embodiments of the disclosure described herein comprise this kind of generally elongate two-part system employing disposable cartridges. However, it will be appreciated the underlying principles described herein may equally be adopted for other electronic cigarette configurations, for example modular systems comprising more than two parts, as devices conforming to other overall shapes, for example based on so-called box-mod high performance devices that typically have a more boxy shape.

As described above, the present disclosure relates to (but it not limited to) aerosol provision devices and corresponding aerosol provision systems, such as e-cigarettes and electronic cigarettes.

Figure 1:
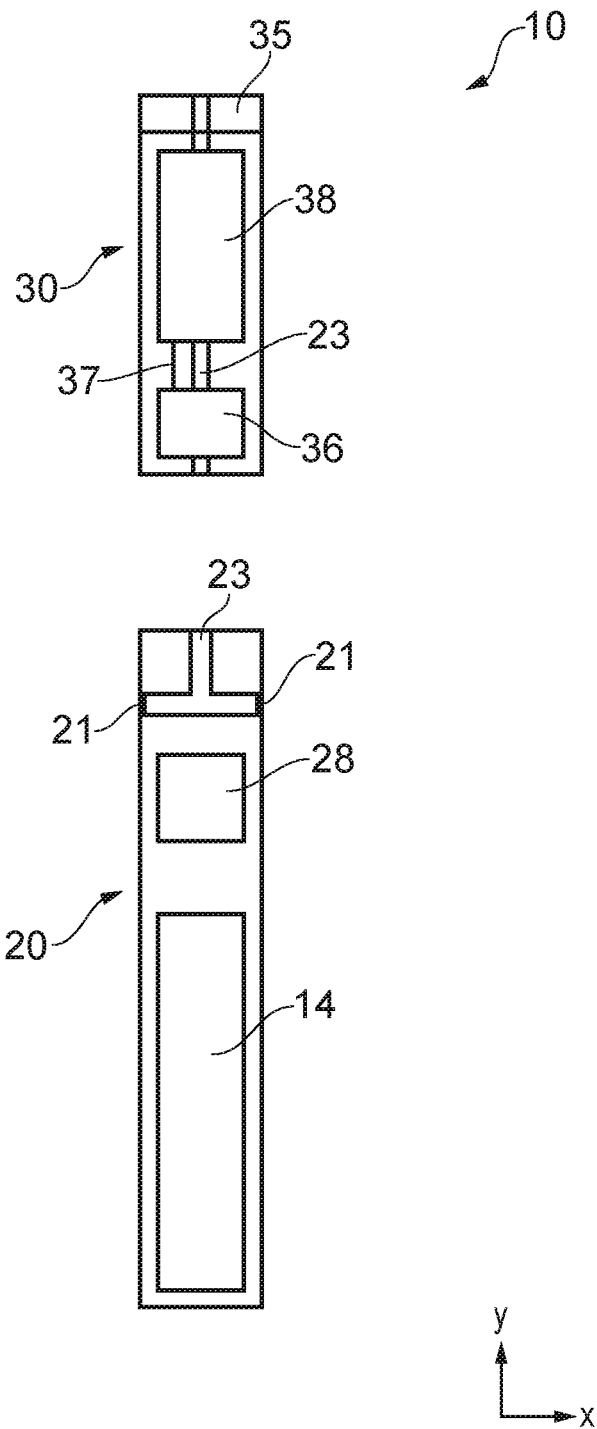
FIGS. 1 and 2 are schematic diagrams of an aerosol provision system.

FIG. 1 is a highly schematic diagram (not to scale) of an example aerosol provision system 10, such as an e-cigarette, to which embodiments are applicable. The aerosol provision system has a generally cylindrical shape, extending along a longitudinal or y axis as indicated by a dashed line (although aspects of the disclosure are applicable to e-cigarettes configured in other shapes and arrangements), and comprises two main components, namely an aerosol provision device 20 and a consumable 30.

The consumable 30 is an article comprising or consisting of aerosol-generating material 38, part or all of which is intended to be consumed during use by a user. A consumable 30 may comprise one or more other components, such as an aerosol-generating material storage area, an aerosol-generating material transfer component 37, an aerosol generation area, a housing, a wrapper, a mouthpiece 35, a filter and/or an aerosol-modifying agent.

A consumable 30 may also comprise an aerosol generator 36, such as a heating element, that emits heat to cause the aerosol-generating material 38 to generate aerosol in use. The aerosol generator 36 may, for example, comprise combustible material, a material heatable by electrical conduction, or a susceptor. It should be noted that it is possible for the aerosol generator 36 to be part of the aerosol provision device 20 and the consumable 30 then may comprise the aerosol-generating material storage area for the aerosol-generating material 38 such that, when the consumable 30 is coupled with the aerosol provision device 20, the aerosol-generating material 38 can be transferred to the aerosol generator 36.

The aerosol-generating material 38 is a material that is capable of generating aerosol, for example when heated, irradiated or energized in any other way. The aerosol-generating material 38 may, for example, be in the form of a solid, liquid or gel which may or may not contain an active substance and/or flavorants. In some embodiments, the aerosol-generating material 38 may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material may for example comprise from about 50 wt %, 60 wt % or 70 wt % of amorphous solid, to about 90 wt %, 95 wt % or 100 wt % of amorphous solid.

The aerosol-generating material 38 comprises one or more ingredients, such as one or more active substances and/or flavorants, one or more aerosol-former materials, and optionally one or more other functional materials such as pH regulators, coloring agents, preservatives, binders, fillers, stabilizers, and/or antioxidants.

The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

In some embodiments, the active substance comprises nicotine. In some embodiments, the active substance comprises caffeine, melatonin or vitamin B12.

The aerosol provision device 20 includes a power source 14, such as a battery, configured to supply electrical power to the aerosol generator 36. The power source 14 in this example is rechargeable and may be of a conventional type, for example of the kind normally used in electronic cigarettes and other applications requiring provision of relatively high currents over relatively short periods. The battery 14 may be recharged through the charging port (not illustrated), which may, for example, comprise a USB connector.

The aerosol provision device 20 includes control circuitry 28 configured to monitor and/or control the operation of the aerosol provision system 10 and provide conventional operating functions in line with the established techniques for controlling aerosol provision systems such as electronic cigarettes. The control circuitry (processor circuitry) 28 may be considered to logically comprise various sub-units/circuitry elements associated with different aspects of the electronic cigarette's operation. For example, depending on the functionality provided in different implementations, the control circuitry 28 may comprises power source control circuitry for controlling the supply of electrical power from the power source 14 to the aerosol generator 36, user programming circuitry for establishing configuration settings (e.g. user-defined power settings) in response to user input, as well as other functional units/circuitry associated functionality in accordance with the principles described herein and conventional operating aspects of electronic cigarettes. It will be appreciated the functionality of the control circuitry 28 can be provided in various different ways, for example using one or more suitably programmed programmable computer(s) and/or one or more suitably configured application-specific integrated circuit(s)/circuitry/chip(s)/chipset(s) configured to provide the desired functionality.

The aerosol provision device 20 illustrated in FIG. 1 includes one or more air inlets 21. In use, as a user inhales on the mouthpiece 35, air is drawn into the aerosol provision device 20 through the air inlets 21 and along an air channel 23 to the aerosol generator 36, where the air mixes with the vaporized aerosol-generating material 38 and forms a condensation aerosol. The air drawn through the aerosol generator 36 continues along the air channel 23 to a mouthpiece 35, carrying some of the aerosol with it, and out through the mouthpiece 35 for inhalation by the user. It will be appreciated that the one or more air inlets may be provided on the consumable 30 such that the air channel 23 is entirely contained within the consumable 30, or the aerosol provision device 20 and the consumable 30 may each comprise at least one air inlet 21 and a portion of the air channel 23.

By way of a concrete example, the consumable 30 comprises a housing (formed, e.g. from a plastics material), a reservoir formed within the housing for containing the aerosol-generating material 38 (which in this example may be a liquid which may or may not contain nicotine), an aerosol-generating material transfer component 37 (which in this example is a wick formed of e.g., glass or cotton fibers, or a ceramic material configured to transport the liquid from the reservoir using capillary action), an aerosol generating area, and a mouthpiece 35. Although not shown, a filter and/or aerosol modifying agent (such as a flavor imparting material) may be located in, or in proximity to, the mouthpiece 35. The consumable of this example comprises a heater element formed from an electrically resistive material (such as NiCr8020) spirally wrapped around the aerosol-generating material transfer component 37, and located in the air channel 23. The area around the heating element and wick combination is the aerosol generating area of the consumable 30. The consumable comprises suitable electrical contacts for coupling to electrical contacts provided on the aerosol provision device 20, such that electrical power may be supplied directly to the heater element.

Figure 2:
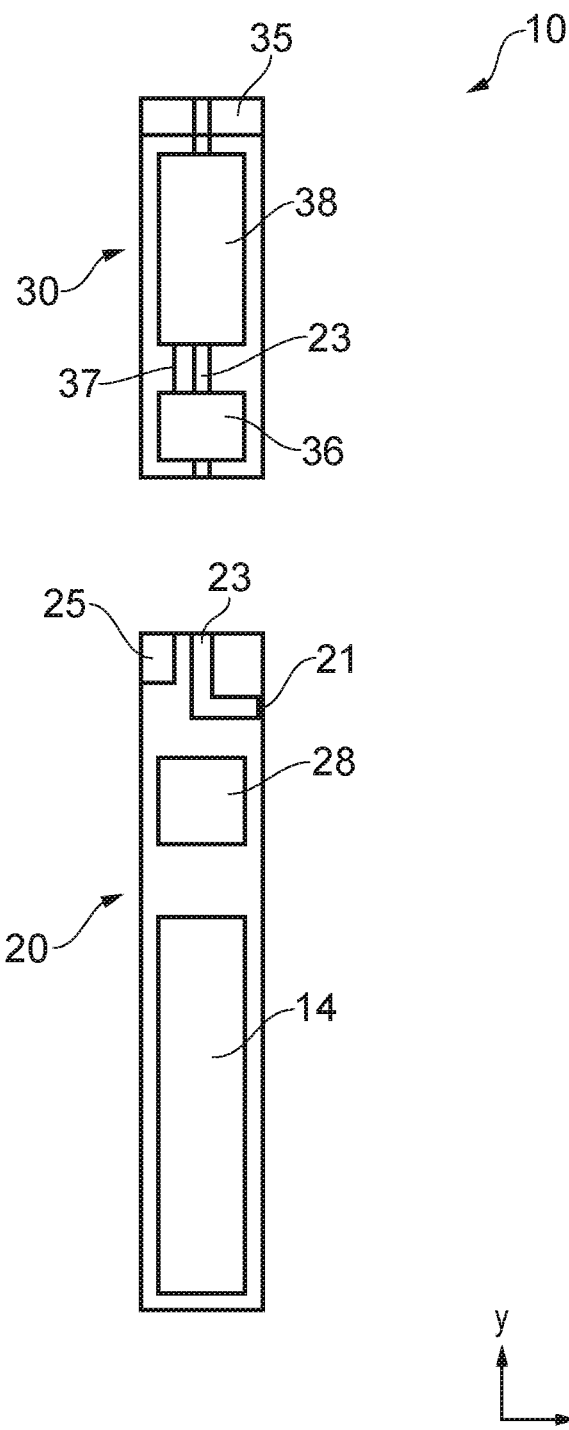

FIG. 2 is a schematic diagram of a further example of an aerosol provision system 10, where the same reference signs have been used for like elements between the aerosol provision system 10 illustrated in FIG. 1 and the aerosol provision system 10 illustrated in FIG. 2.

The aerosol provision system 10 in FIG. 2 comprises a sensor 25 configured to detect an inhalation on the aerosol provision system 10 by a user of the aerosol provision system 10. For example, the sensor 25 may be a flow sensor, a microphone, a pressure sensor, light sensor, touch sensor, accelerometer, gyroscope, or any other type of sensor suitable for directly or indirectly detecting or inferring an inhalation on the aerosol provision system 10 by a user of the aerosol provision system 10. Although the sensor 25 illustrated in FIG. 2 is part of the aerosol provision device 20, this is not essential. In other embodiments the sensor 25 may be part of the consumable 30.

Figure 3:
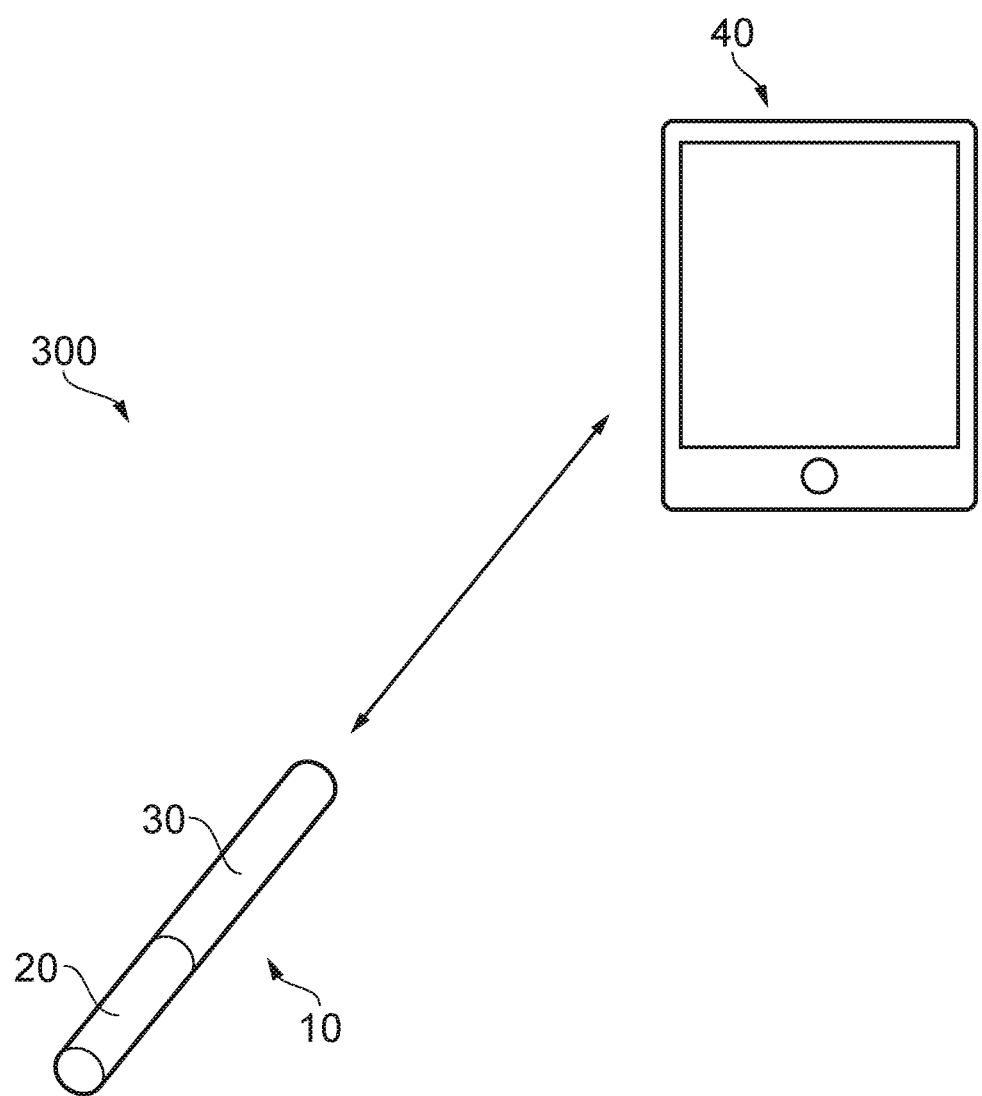
FIG. 3 illustrates a system comprising an aerosol provision system and a computer.

FIG. 3 illustrates a system 300 comprising an aerosol provision system 10 configured to generate aerosol from an aerosol-generating material 38, such as described above. The system 300 also comprises a computer. As will be described later herein, the computer may be located in the aerosol provision system 10, or in a remote device 40. For example, the user of the aerosol provision system 10 may have a remote device 40 associated with, but separate from, the aerosol provision system 10. The remote device 40 may include any suitable electronic device that can be communicatively coupled to the aerosol provision system 10. For example, the remote device 40 may include a mobile device (such as a smartphone), a PDA, a personal computer, laptop, tablet, smartwatch, etc. The functions of the computer may be shared between processors (control circuitry) on each of these devices, and/or a remote server (not shown). Accordingly, the aerosol provision system 10 and the computer may be physically separated. The aerosol provision system 10 and the computer may therefore be configured to communicate utilizing Bluetooth, Bluetooth Low Energy (BLE), ANT+, Wi-Fi, SigFox or any other suitable wireless communication method.

The computer is configured (for example by suitable software instruction) to perform the following functions:

firstly, it obtains user behavior data relating to an amount of an ingredient delivered from the aerosol-generating material 38 to a user of the aerosol provision system 10;

secondly, it determines default user behavior with respect to the amount of the ingredient to be delivered on the basis of the obtained user behavior data; and then, it identifies, based on the obtained user behavior, under what conditions to deliver a notification to the user, the notification informing the user of the user's current behavior.

With regards to the first function, it will be appreciated, the amount of aerosol, and by extension the amount of aerosol-generating material 38, delivered to the user during an inhalation will vary based on various factors, such as the duration of the inhalation, the type of aerosol-generating material aerosolized, the temperature of aerosol generator 36, the amount of electrical power delivered to the aerosol generator 36, the speed or mass flow of the air through the aerosol provision system 10, etc. As described above, the aerosol-generating material 38 comprises one or more ingredients. The ingredient may be an active substance, such as nicotine, caffeine, taurine, theine, vitamins such as B6 or B12 or C, melatonin, cannabinoids, or constituents, derivatives, or combinations thereof. The ingredient may be a flavorant, an aerosol-former material or a functional material such as a pH regulator, coloring agent, preservative, binder, filler, stabilizer or antioxidant. The amount of each of the one or more ingredients delivered from the aerosol-generating material 38 to the user during the inhalation will also vary based on the amount of aerosol delivered to the user during the inhalation. Further, for a given amount of aerosol generated by the aerosol generator 36 from the aerosol-generating material 38, the amount of the ingredient in the resulting aerosol will vary depending on the concentration, in other words the amount, of the ingredient in the aerosol-generating material 38. Accordingly, the user behavior data may be dependent on a concentration of the ingredient in the aerosol-generating material 38 and/or an indication of a flavorant present in the aerosol-generating material 38.

The user behavior data may comprise any sensor data or user interface interaction data relating to an amount of an ingredient delivered from the aerosol-generating material 38 to the user. Examples relating to inhalation based interactions include one or more of the frequency of inhalation actions, regularity/irregularity/distribution of inhalation actions, shallowness/depth/volume of inhalation, and duration of inhalation. For example, as described above in relation to FIG. 2, the aerosol provision system 10 may comprise a sensor 25 configured to detect an inhalation by the user on the aerosol provision system 10. In response to detecting an inhalation on the aerosol provision system 10 by a user of the aerosol provision system 10, the sensor 25 may be configured to output corresponding inhalation detection signals to the computer.

The user behavior data may include a duration of each inhalation and a time between each inhalation. For example, in response to receiving the inhalation detection signals, the computer may then determine an indication of an amount of an ingredient delivered from the aerosol-generating material 38 to the user during the inhalation based on the inhalation detection signals. This may involve determining a duration of each inhalation and/or a time between each inhalation, for example using a timer or other timekeeping means such as a clock associated with the computer. Alternatively, the computer may receive an indication of the duration of each inhalation and and/or a time between each inhalation directly from the aerosol provision system 10 or other suitable source.

The user behavior data may include data relating to one or more operational parameters of the aerosol provision system 10, such as an amount of electrical power supplied to the aerosol generator 36 by the power source 14, a power level or setting for the aerosol generator 36, an amount of charge in the power source 14, a temperature of the aerosol generator 36 or a temperature proximate to the aerosol generator 36.

The computer may be configured to obtain user behavior data for a plurality of sample points within a predetermined period of time. Hence user data for each hour of the day may be collected, so that behavior on an hour by hour basis over the course of a day may be determined. Alternatively or in addition, user data for different locations may be collected, optionally with filters limiting locations to those visited multiple times, and/or where the user remains for more than a threshold period of time. It will be appreciated therefore that this can also equate to obtaining user behavior data for a plurality of sample points within a predetermined period of time, where that period corresponds to the user's measured, typical, or average duration at a location (for example home, work, in town, etc.). Optionally, transit may be considered a virtual location as well (in this case, the locations of the moving, for example when the user is in a car or on a train). Optionally, a user may blacklist a current location via a user interface so that it is not included in such data.

For some ingredients, the amount of residual ingredient in the user's body system will decrease over time as the ingredient is absorbed, broken down, expelled or otherwise depleted from the user's body system. By considering the time between each inhalation and the duration of each inhalation, an indication of an amount of the ingredient delivered from the aerosol-generating material 38 can indicate the amount of residual ingredient in the user's body system rather than just the amount of the ingredient delivered to the user. Accordingly, the user behavior data can include a residual amount of the ingredient based on the duration of each inhalation and the time between each inhalation.

With regards to the second function, default user behavior is determined by the computer with respect to the amount of the ingredient to be delivered on the basis of the obtained user behavior data. In other words, the computer is configured to detect patterns in the user behavior relating to usage of the aerosol provision system 10 by the user and the amount of the ingredient to be delivered.

The default user behavior can be determined for an inhalation. For example, the default user behavior may correspond to an average inhalation profile by the user of the aerosol provision system 10. This may take account of one or more of elements of the user behavior described above, such as the duration of the inhalation, the average air speed or mass flow of the air through the aerosol provision system 10, the change in air speed or mass flow of the air through the aerosol provision system 10 during the inhalation, and the type and/or concentration of one or more of the ingredients in the aerosol-generating material 38. The default user behavior may account for an operational parameter of the aerosol provision system 10 during the inhalation, such as an amount of electrical power supplied to the aerosol generator 36 by the power source 14, a power level or setting for the aerosol generator 36, an amount of charge in the power source 14, a temperature of the aerosol generator 36 or a temperature proximate to the aerosol generator 36, along with changes to any of these settings during the inhalation.

Each of the factors described can affect the amount of the ingredient delivered for an inhalation, and therefore each can be considered when determining default user behavior with respect to the amount of the ingredient to be delivered for an inhalation.

Accordingly, in the context of a single puff, the default user behavior may be a default amount of the ingredient and/or aerosol delivered per inhalation. As discussed above, this amount may be influenced by a number of factors.

The default user behavior may be determined by any suitable statistical analysis. For example, where the user data relates to a continuous variable such as frequency of inhalation, volume of inhalation or duration of inhalation, then an average value for this property may be determined as the default. Optionally the variance or standard deviation of the average may also be determined as an indicator of how accurate or reliable this determined default user behavior is (hence for example a narrow variance suggests an accurate estimate, whilst a wide variance suggests that whilst the estimate is representative, it is unlikely to be accurate for any individual instance).

Other data may be expressed using multiple continuous variables, such as values characterizing the regularity of inhalation, or the distribution pattern of inhalation. For example a user may habitually inhale in a so-called 'bursting' pattern, where the user frequently inhales on the aerosol provision system 10 for a limited period of time before pausing for an extended period of time, and then repeating this pattern. Such a pattern of inhalations may also be referred to as session based usage, where a session is defined as the collection of inhalation within the limited period of time. Alternatively the user may habitually inhale in the so-called 'grazing' pattern, where the user inhales on the aerosol provision system 10 less frequently than in the bursting pattern, but without extended pauses.

Accordingly, the default user behavior may be determined for a plurality of inhalations, wherein a time between each of the plurality of inhalations is less than a predetermined time, in order to capture the 'bursting' pattern as described above. In other words, the default user behavior can be determined on the basis of whether the user performs a 'bursting' pattern or a 'grazing' pattern. Further, the default user behavior can account for trends in the patterns of inhalation by the user. For example, the user behavior data may indicate that the user performs a 'bursting' pattern in the mornings, but then switches to a 'grazing' pattern in the afternoons or evenings. The user may perform a 'bursting' pattern on weekdays but a 'grazing' pattern at weekends. Accordingly, the default user behavior can be determined on the basis of the obtained user behavior data for a plurality of inhalations in order to account for such patterns of behavior.

Such patterns may be expressed using average inhalation frequency data, but may be more accurately expressed with the addition of a low-frequency or aggregate inhalation frequency data showing patterns or their absence over a longer timeframe commensurate with the bursting pattern. Alternatively, the pattern may be expressed using average inhalation frequency data compiled for inhalations separated by less than the predetermined time, together with average pause times for gaps in inhalation greater than that predetermined time. Alternatively or in addition, such plans may be expressed using other analyses, such as k-means clustering of inhalation records and/or any of the above values to classify the user behavior as bursting, grazing or any other characteristic pattern identifiable within the data. In any event, for one or more types of data and/or one or more periods of time or equally locations, a statistical representation of the user's typical or default behavior for a particular facet of their interaction with the aerosol provision system 10 may be determined in this manner.

It will be appreciated that such a determination can relate to behavior predictable over a long period of time, for example in the order of weeks or months. In other words, the default user behavior can be determined based on at least one of a time in a day, a day in a week and a period of at least a week. This could be default user behavior on the basis of user behavior data obtained for a particular time in a day, such as an hour, a series of hours such as a morning or a 12 hour period, a particular day in a week, such as a Monday, a Wednesday, a week day or a weekend, for a period of at least a week, such as a fortnight, a month or longer such as a quarter of a year or a year. Alternatively or in addition, the determined default user behavior could represent the default user behavior for a time in a day, a day in a week and/or a period of at least a week. Equally, even if a statistical model relates to an individual hour of the day, it is based on data for that hour of the day derived from multiple days, and potentially multiple weeks or even months.

Optionally, in recognition that a user can slowly change their behavior (for example due to a change in personal circumstance, a change of work, or as part of a behavior cessation plan), then such statistical representations of typical/default user behavior may be rolling representations (for example based on the last L hours, M days, N weeks or O months of data), or multiple representations of the same data may be maintained; for example statistical representation of the typical/default user behavior with respect to the amount of the ingredient to be delivered may be based on a month's data, but a separate measure behavior may be based on the last week's data; accordingly, if the variance in the separate measure exceeds a threshold indicative that the user's behavior is changing, and/or if the average diverges from the longer term average, then this may indicate the need to build or start to build a new statistical representation based on more recent data.

A further function of the computer is to identify, based on the obtained user behavior, under what conditions to deliver a notification to the user, the notification informing the user of the user's current behavior.

A user's current behavior may be determined through a similar monitoring process as described above in relation to obtaining user behavior data. For example, at least a subset of the same means used to gather the user behavior data underlying the default user behavior may be obtained by the computer. Hence, for example, data relating to frequency of inhalation, volume and/or duration of inhalation may again be detected using a sensor 25 and a timekeeping means, as discussed previously. The computer may perform corresponding statistical analyses to those described previously herein with regards to the determination of typical/default user behavior, to enable or simplify comparison.

The user's current behavior may be an inhalation or a plurality of inhalations corresponding to a bursting pattern. Alternatively or in addition, the user's current behavior may be determined over a longer period, such as a rolling time period, for example a rolling period of an hour, 24 hours (a day), a week (working week or calendar week), or longer such as a fortnight, a month or a quarter of a year. As will be appreciated, a rolling time period is intended to mean the period of time immediately prior to any point in time, such that, for example, a rolling 24 hour period represents the 24 hour time period immediately prior to any point in time (in other words the most recent 24 hours in time at any point in time).

In this case however, the statistical analysis is performed on relatively short-term, or "current", user behavior data. Hence for example whilst a facet of default user behavior for a given location or a given time of day may be determined using data over a number of days or weeks, the user's current behavior may be based on the last 5, 15, 30, 60, 90 or 120 minutes, or as appropriate based on data since the user arrived at a given location, entered a given state, or commenced a detectable activity.

The computer identifies under what conditions to deliver a notification to the user. In other words, the computer determines when and how a notification should be delivered to the user. For example, one of the conditions may be that notifications are sent to the user periodically, such as every hour, every day or every week. Alternatively, or in addition, the condition may be that notifications are provided at the end of the period which the current user behavior relates to. For example, if the current user behavior relates to an inhalation or a 'burst' pattern, the notification may be provided at the end of the inhalation or 'burst' pattern respectively.

One of the conditions may be that notifications are only sent at certain times, such as only at certain times of the day, or certain days of the week. For example, a notification may only be sent to the user once a day or once a week, such that the notification provides a daily or weekly summary of the user's current behavior.

In some embodiments, at least some of the conditions are identified by comparing the user's current behavior with the default user behavior. In other words, the short-term current user behavior is compared with the determined typical/default/long term user behavior data for one or more facets/types of user behavior. The current user behavior may be a single inhalation or a plurality of inhalations corresponding to a bursting pattern, but this current user behavior may be compared to default user behavior for an inhalation, a plurality of inhalations corresponding to a bursting pattern as well as longer-term default user behaviors, such as default user behaviors over an hour, a day, a week, a month or longer.

The notification may also include the default user behavior, such that the user is made aware of any differences or similarities between their current behavior and the default user behavior The notification may be provided when the user's current behavior deviates from the default user behavior. If it is identified that the user's current behavior has deviated from the default user behavior, a notification may be provided to the user at the end of the period defining the current user behavior, such as at the end of a 'burst' pattern, the end of a day, the end of a week or the end of a month. The computer may determine the number of instances the user's current behavior deviated from the default user behavior in the particular time period, and provide the number of instances as part of the notification. The notification may also contain an indication that of the magnitude of the deviation from the default user behavior. Alternatively, the notification may be provided to the user at the moment in time when the user's current behavior deviates from the default user behavior.

Alternatively or in addition, the notification may be provided when the user's current behavior matches the default user behavior, or is within a threshold of the default user behavior. In other words, the notification provides an indication to the user that they are continuing to interact with the aerosol provision in accordance with their standard behaviors and patterns.

A notification may be provided when patterns in the user's current behavior are detected that reflect patterns determined from the user behavior data. For example, the user behavior data may relate to bursting, grazing or any other characteristic patterns identifiable within the data as described above. A notification may then be provided to the user when the user's current behavior matches one of these patterns. For example, the user's current behavior might indicate that the user is a burst user (inhalations follow a 'burst' pattern) or a grazing user (inhalations follow a 'graze' pattern). Further, the default user behavior may indicate that the user follows one particular pattern, such as a 'burst' pattern, bur the current user behavior follows a different pattern, such as a 'graze' pattern. A notification can then be sent to the user to inform the user that they are currently following a 'graze' pattern. The notification may also inform the user that they usually follow a 'burst' pattern.

The notification informing the user of the user's current behavior may be provided on the aerosol provision system 10, such as by activating an indicator light, emitting a sound from a speaker or displaying a message on a display screen on the aerosol provision device 20 and/or the consumable 30. The notification may also be a haptic notification on the aerosol provision system 10, such as a vibration or force feedback. For example, a vibration may be generated by an eccentric rotating mass (ERM) or piezoelectric actuator within the aerosol provision device 20 and/or the consumable 30, or a force may be generated by a motor within the aerosol provision device 20 and/or the consumable 30. The notification could also be a change in a mode of operation of the aerosol provision system 10 which the user would detect, such switching off, disabling or otherwise preventing electrical power from being supplied to the aerosol generator 36. For example, the aerosol generator 36 could be disabled for a period of time, such as 5 seconds, 10 seconds, a minute or longer.

As described above, the aerosol provision system 10 and the computer may be physically separated. Accordingly, the computer may transmit instructions to the control circuitry 28 of the aerosol provision system 10 to provide the notification to the user.

Alternatively, or in addition, the notification may be provided on the remote device 40. Again, if the computer is located on the aerosol provision system 10, the computer may transmit instructions to the remote device 40 to provide the notification to the user on the remote device 40, such as on an application installed on the remote device 40. For example, a message may be displayed on a display screen on the remote device 40, an indicator light activated, a sound emitted from a speaker or a haptic notification means on the remote device 40 as described above. The notifications on the remote device 40 may be push notifications, or may be a passive notification.

As described above, the notification informs the user of the user's current behavior. This may comprise any of the data used to determine the user's current behavior and/or the user behavior data, such as a duration of an inhalation, a time between inhalations, an indication of an amount of an ingredient delivered from the aerosol-generating material 38 to the user during an inhalation, a plurality of inhalations or a rolling time period such as a rolling 24 hour period, and/or an operating parameter of the aerosol provision system 10 during an inhalation, a plurality of inhalation or a rolling time period such as a rolling 24 hour period.

In some embodiments, the notification also comprises a suggested adjustment of the aerosol provision system. For example, the suggested adjustment could be an operating parameter of the aerosol provision system 10, such as a setting or level corresponding to an amount of electrical power supplied to the aerosol generator 36 the aerosol generation system 10 by a power source 14 of the aerosol generation system 10 or a duty cycle or heating profile of the aerosol generator 36 in order to change the temperature of the aerosol generator 36 and therefore alter the amount of the ingredient that is delivered to the user during one or more inhalations. Alternatively, the operating parameter could be, the flow rate (air speed or mass flow) through the aerosol provision system 10, since reducing the flow rate can increase the density of aerosol and increase the amount of ingredient delivered for a given volume of air inhaled.

Alternatively, the suggested adjustment could relate to a property of the consumable 20, such as changing to a consumable 20 with a different aerosol-generating material 38, a different concentration of the ingredient in the aerosol-generating material 38, a different flavorant present in the aerosol-generating material 38, and/or a consumable with a different capacity of aerosol-generating material 38.

The suggested adjustment may depend on various factors, such as the amount by which the current user interaction has deviated from the default user behavior, the nature of the deviation, or the number of times the current user interaction has deviated from the default user behavior in a particular time period, such as an hour, a day or a week. The user may also be able to configure the suggested adjustment. For example, the user may be able to disable suggested adjustments of operational parameters, or configure a time period during which such suggested adjustments are provided, such as only during the day or only in the mornings. If the user has unexpectedly switched from grazing to bursting or high-frequency consumption, which may be indicative of stress or limited available time, then suggested adjustment may correspond to relate to a stress mitigation action, such as suggestion to provide an alternative form of notification, such as playing a calming sound, or displaying calming visual display, or by providing passive notifications on the remote device 40 rather than push notifications.

The notification may be configurable by the user. In other words, the user may be able to adjust the one or more parameters associated with the notification on the aerosol provision system 10 and/or the remote device regardless of whether the notification is provided on the aerosol provision system 10 or the remote device. For example, the user may be able to use the application on the remote device to adjust one or more of the parameters associated with the notification even though the notification itself is provided on the aerosol provision system 10. For example, the user may disable notifications during an inhalation such that notifications are only received when an inhalation is not detected by the sensor 25. The user may be able to adjust the number, brightness and/or color of the indictor light that is activated, the volume, pitch and or duration of the sound emitted and/or the message that is displayed. The user may also be able to adjust one or more parameters of the haptic notification. For example the user may be able to adjust the duration, magnitude and/or pattern of the vibrations or forces provided by the actuator and motor respectively.

The user may also be able to adjust the conditions under which the notification is delivered to the user. For example, the user may wish for notifications to only be sent at certain intervals, such as once an hour, once a day or once a week, or only on week days. The user may disable or otherwise prevent notifications which are triggered by certain conditions, such as disabling notifications relating to a single inhalation or a 'burst' pattern as described above. The user may wish to only receive notifications about current user behavior relating to longer term patterns of behavior, such as based on a day, a week, a month or longer.

Figure 4:
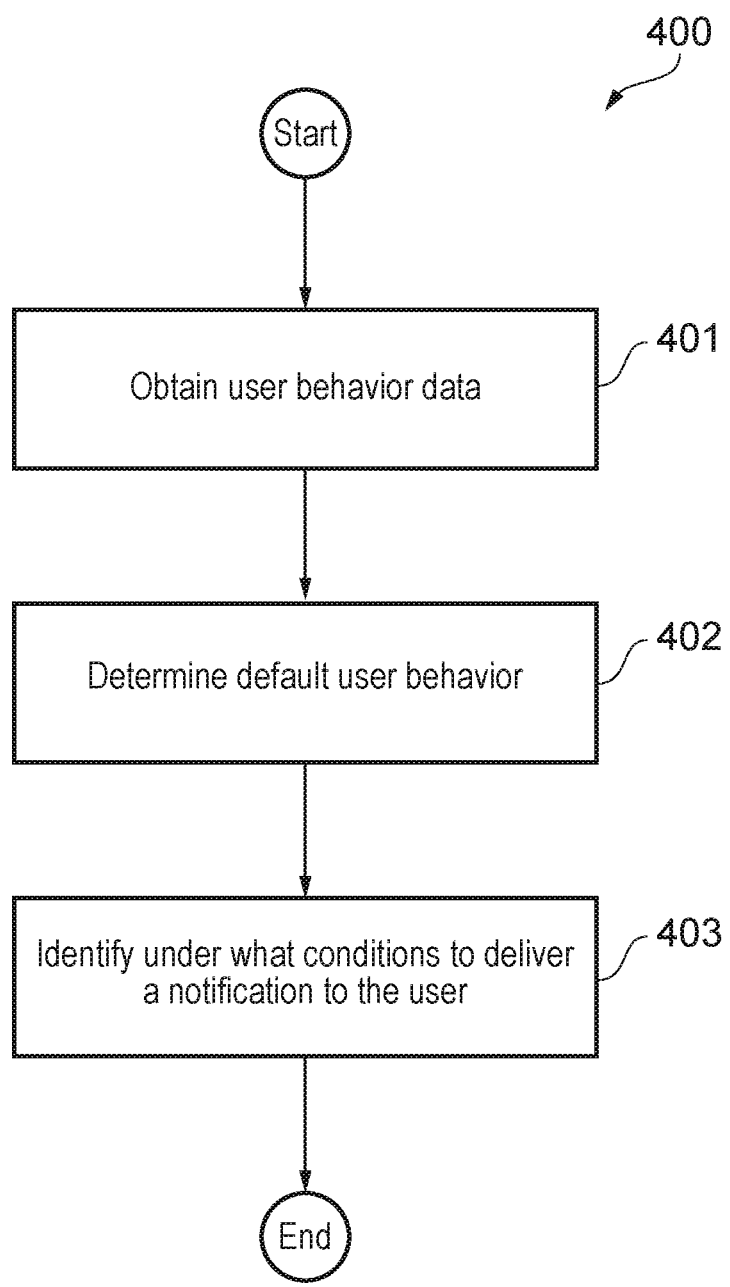
FIG. 4 is a flow chart of a method of aerosol provision.

In some embodiments, the computer is configured to store at least one of the user behavior data and the default user behavior data. The computer is then able to easily recall the user behavior data from the store in order to determine the default user behavior and the conditions under which to deliver the notification to the user. Alternatively or in addition, the computer may be configured to transmit least one of the user behavior data and the default user behavior to a remote device, for example for storage or for further analysis. This reduces the amount of data that needs to be stored at the computer, but requires retrieval by the computer when the user behavior data and/or the default user behavior is required for processing. Referring to FIG. 4, the computer may be located in the aerosol provision system 10 and the user behavior data and/or the default user behavior may be stored at the remote device 40. Regardless of the location of the computer and the location of where the user behavior data and the default user behavior data is stored, the stored user behavior data and the default user behavior data can be updated as more data is generated and the computer updates the default user behavior as described above.

FIG. 4 is a flow chart of a method 400 of aerosol provision. The method begins at 401, where user behavior data relating to an amount of an ingredient delivered from an aerosol-generating material to a user of an aerosol provision system is obtained. At 402, default user behavior with respect to the amount of the ingredient to be delivered is determined on the basis of the obtained user behavior data. At 403, it is identified, based on the obtained user behavior, under what conditions to deliver a notification to the user, the notification informing the user of the user's current behavior.

As described above, a computer may be configured to perform the method 400 illustrated in FIG. 4. The method 400 illustrated in FIG. 4 may be stored as instructions on a computer readable storage medium, such that when the instructions are executed by a processor, the method 400 described above is performed. The computer readable storage medium may be non-transitory.

As described above, the present disclosure relates to (but it not limited to) a system comprising an aerosol provision system and a computer. The aerosol provision system is configured to generate aerosol from an aerosol-generating material. The computer is configured to obtain user behavior data relating to an amount of an ingredient delivered from the aerosol-generating material to a user of the aerosol provision system. The computer then determines default user behavior with respect to the amount of the ingredient to be delivered on the basis of the obtained user behavior data. The computer then identifies, based on the obtained user behavior, under what conditions to deliver a notification to the user, the notification informing the user of the user's current behavior.

Thus, there has been described a system comprising an aerosol provision system and a computer, a computer, a method of aerosol provision and a computer readable storage medium.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A system comprising:
    an aerosol provision system configured to generate aerosol from an aerosol generating material; and
    a computer configured to:
        obtain user behavior data relating to an amount of an ingredient delivered from the aerosol generating material to a user of the aerosol provision system,
        determine default user behavior with respect to the amount of the ingredient delivered on the basis of the obtained user behavior data, the default user behavior comprising the user's typical behavior; and
        identify, based on the obtained user behavior, whether one or more conditions to deliver a notification to the user are met, the notification informing the user of a current user behavior with respect to the amount of the ingredient delivered, wherein at least some of the conditions are identified by comparing the current user behavior with the default user behavior.

2. The system of claim 1, wherein the default user behavior is determined for an inhalation.

3. The system of claim 1, wherein the default user behavior is determined for a plurality of inhalations, wherein a time between each of the plurality of inhalations is less than a predetermined time.

4. The system of claim 1, wherein the default user behavior is determined based on at least one of a time in a day, a day in a week, and a period of at least a week.

5. The system of claim 1, wherein the user behavior data includes a duration of each inhalation and a time between each inhalation.

6. The system of claim 5, wherein the user behavior data includes a residual amount of the ingredient based on the duration of each inhalation and the time between each inhalation.

7. The system of claim 1, wherein the user behavior data includes at least one of an operational parameter of the aerosol provision system, a concentration of the ingredient in the aerosol-generating material, and an indication of a flavor present in the aerosol-generating material.

8. The system of claim 1, wherein the current user behavior is an inhalation.

9. The system of claim 1, wherein the current user behavior is a plurality of inhalations, wherein a time between each of the plurality of inhalations is less than a predetermined time.

10. The system of claim 1, wherein the current user behavior is over a rolling time period.

11. The system of claim 1, wherein the notification comprises a suggested adjustment of an operational parameter of the aerosol provision system, wherein the operational parameter is a setting corresponding to an amount of electrical power supplied to an aerosol generator of the aerosol provision system by a power source of the aerosol provision system, wherein the aerosol generator is configured to aerosolize the aerosol-generating material.

12. The system of claim 1, wherein the notification comprises a suggested adjustment of an operational parameter of the aerosol provision system, wherein the suggested adjustment comprises at least one of a different aerosol-generating material, a different concentration of the ingredient, and a different flavorant in the aerosol-generating material.

13. The system of claim 1, wherein the notification is provided on one or more of:
    the aerosol provision system; and
    an application on a remote device.

14. The system of claim 1, wherein the notification is a haptic notification, wherein a parameter of the haptic notification is adjustable by the user of the aerosol provision system.

15. The system of claim 1, wherein the notification is configurable by the user.

16. The system of claim 1, wherein the ingredient is nicotine, caffeine, taurine, theine, a vitamin, melatonin, or a cannabinoid.

17. The system of claim 1, wherein the computer is further configured to perform one or more of:
    store at least one of the user behavior data and the default user behavior; and
    transmit at least one of the user behavior data and the default user behavior to a remote device.

18. A computer configured to:
    obtain user behavior data relating to an amount of an ingredient delivered from an aerosol generating material of an aerosol provision system to a user of the aerosol provision system;
    determine default user behavior with respect to the amount of the ingredient delivered on the basis of the obtained user behavior data, the default user behavior comprising the user's typical behavior; and
    identify, based on the obtained user behavior, whether one or more conditions to deliver a notification to the user are met, the notification informing the user of a current user behavior with respect to the amount of the ingredient delivered, wherein at least some of the conditions are identified by comparing the current user behavior with the default user behavior.

19. A method of aerosol provision comprising:
    obtaining user behavior data relating to an amount of an ingredient delivered from an aerosol generating material of an aerosol provision system to a user of the aerosol provision system;
    determining default user behavior with respect to the amount of the ingredient delivered on the basis of the obtained user behavior data, the default user behavior comprising the user's typical behavior; and
    identifying, based on the obtained user behavior, whether one or more conditions to deliver a notification to the user are met, the notification informing the user of a current user behavior with respect to the amount of the ingredient delivered, wherein at least some of the conditions are identified by comparing the current user behavior with the default user behavior.

20. A non-transitory computer readable storage medium comprising instructions which, when executed by a processor, cause the processor to:

obtain user behavior data relating to an amount of an ingredient delivered from an aerosol generating material of an aerosol provision system to a user of the aerosol provision system;

determine default user behavior with respect to the amount of the ingredient delivered on the basis of the obtained user behavior data, the default user behavior comprising the user's typical behavior; and identify, based on the obtained user behavior, whether one or more conditions to deliver a notification to the user are met, the notification informing the user of a current user behavior with respect to the amount of the ingredient delivered, wherein at least some of the conditions are identified by comparing the current user behavior with the default user behavior.

21. The system of claim 1, wherein the determined default user behavior accounts for patterns of user behavior.

22. The system of claim 1, wherein a condition for providing a notification is the user's current behavior deviating from the default user behavior.

23. The system of claim 22, wherein the computer is configured to determine whether the deviation is indicative of a user being stressed when determining a notification to be delivered.

24. The system of claim 22, wherein the notification comprises a suggested adjustment of an operational parameter of the aerosol provision system.

25. The system of claim 1, wherein a condition for providing a notification is the user's current behavior matching the default user behavior.

\* \* \* \* \*